United States Patent Office 2,873,181
Patented Feb. 10, 1959

2,873,181

COATED ABRASIVE ARTICLE AND METHOD OF MAKING

Carlton M. Hanford, Buffalo, N. Y., assignor to The Carborundum Company, Niagara Falls, N. Y., a corporation of Delaware No Drawing. Application September 1, 1954
Serial No. 453,691

10 Claims. (Cl. 51—298)

This invention relates to coated abrasive articles in which the bond for attaching the abrasive grains is modified by the inclusion of wollastonite, and to a method of making such articles.

Coated abrasives, which have been made for many years and are popularly referred to as "sandpaper" or "emery cloth," are commonly made by applying to a suitable backing a first coat of a liquid adhesive which is referred to in the art as a "making" coat, followed by the immediate application of abrasive grains. The making coat is then solidified to hold the grains temporarily to the backing whereupon a second coat of liquid adhesive, referred to as a "sandsizing" coat, is applied to provide the remainder of the bond. This sandsize coat is then also solidified and the article thus prepared is cut into forms suitable for use such as sheets, rolls, belts, and discs.

For a number of years it has been the practice to modify the bond of some types of coated abrasives by the inclusion in either the making or the sandsizing coat, or both, of a filler in the form of calcium carbonate which is ground to a particular size as taught in U. S. Patent 2,322,156. Such products have been widely used and although the addition of the filler has been found to make products which are satisfactory for many purposes, some difficulty is experienced, particularly with the finer grits where the liquid adhesives are of comparatively low viscosity, by reason of separation of the filler from the liquid adhesive. There has also been some trouble, particularly where the filler is used in the making coat, caused by separation of the abrasive coating from the backing when the article is mechanically flexed as is almost universally done to make the finished product sufficiently limp and flexible for use.

I have found that products which are superior for some purposes can be made where wollastonite which has been pulverized to a suitable size is employed as a filler instead of the calcium carbonate or other fillers of Patent 2,322,156. I have also found that by suitable treatment of the wollastonite it can be easily dispersed through the liquid adhesive and has much less tendency to settle or separate from the pan in which the adhesive is kept during the coating process. As a consequence the products made according to my new process are more uniform from beginning to end of a particular run. When separation occurs there is an excessive amount of filler in the product made near the end of a run unless steps are taken to adjust the proportions of filler and liquid adhesive in the adhesive mixture during the progress of the run. Furthermore, glue-bonded products embodying wollastonite have less tendency to curl than do the products of the prior art.

It is accordingly an object of the invention to make improved coated abrasive products and to provide an improved method for making such products. Another object of the invention is to provide a method for dispersing wollastonite throughout a liquid adhesive to obtain a composition substantially uniform throughout which will not tend to change in composition while the adhesive is being used. Another object of the invention is to make a coated abrasive product having increased cutting efficiency and life and less tendency to curl. Other objects of the invention will appear from the description hereinafter set forth.

In making my coated abrasive products I employ as the bond either animal glue, which is the oldest and most well known adhesive used in making such products, or a heat-hardenable synthetic resin including a phenol-, urea-, or melamine-formaldehyde condensation product. Either the glue or the resin may be used for both the making and the sandsizing operations or, for some purposes, a glue making coat may be used followed by the application of a synthetic resin of the class enumerated as the sandsizing coat.

The wollastonite filler may be incorporated in either the making coat or the sandsizing coat, or both. Where it is used it is desirable to have it at least in the sandsize, and it is also very frequently used in the making coat.

Wollastonite is a natural mineral consisting of practically pure calcium silicate. It occurs in the form of acicular crystals and somewhat resembles asbestos, being distinctly fibrous in character. Even when ground the mineral retains its fibrous character, the individual particles having a ratio of length to diameter of as much as 15:1.

Following are the results of the examination of 2093 particles under a microscope during which the dimensions of the particles were measured in the conventional manner such as is described on page 3 of Patent 2,322,156 beginning at line 74 of column 1 and extending through line 21 of column 2. Because of the fibrous character of the wollastonite as compared to the chunky, blocky shapes of the calcium carbonate the examination of the wollastonite differed from that of calcium carbonate described in the patent in that both the length and the diameter rather than the average diameter of the particles were recorded.

In making the count no attempt was made to determine the relative length and diameter of particles under 4 microns and all of the particles less than 4 microns in length were grouped and totalled 1650. The remaining 443 particles which were examined had the dimensions set forth in the following table.

| Length in microns: | Number of particles |
|---|---|
| 4–6 | 32 |
| 7–9 | 55 |
| 10–12 | 121 |
| 13–15 | 44 |
| 16–18 | 43 |
| 19–21 | 31 |
| 22–28 | 26 |
| 29–31 | 19 |
| 32–38 | 10 |
| 39–41 | 13 |
| 42–48 | 6 |
| 50 | 5 |
| 55 | 3 |
| 60 | 10 |
| 65 | 2 |
| 70 | 4 |
| 75 | 2 |
| 80 | 6 |
| 85 | 1 |
| 88 | 1 |
| 90 | 2 |
| 100 | 2 |
| 112 | 1 |
| 115 | 1 |
| 125 | 2 |
| 140 | 1 |

| Diameter in microns: | Number of particles |
|---|---|
| 1 | 27 |
| 2 | 50 |
| 3 | 73 |
| 4 | 54 |
| 5 | 85 |
| 6 | 23 |
| 7 | 28 |
| 8 | 21 |
| 10 | 30 |
| 12 | 18 |
| 15 | 16 |
| 16 | 1 |
| 17 | 3 |
| 18 | 3 |
| 20 | 6 |
| 25 | 3 |
| 30 | 2 |

|  | Microns |
|---|---|
| Average length | 21.4 |
| Average diameter | 5.9 |
| $\dfrac{\text{Average length}}{\text{Average diameter}}$ | 3.63 |

When wollastonite is mixed with water alone the fibers tend to agglomerate and it is therefore highly desirable if not necessary to employ a deflocculating agent such as sodium hexametaphosphate or the ordinary sodium silicate. The deflocculating agent is preferably dissolved in the water and the wollastonite particles are then stirred in whereupon a very thick paste is obtained which cannot be satisfactorily mixed with the glue or resin liquid adhesive. It has been found, however, that upon standing for a few hours this thick paste thins out and makes a dispersion of the wollastonite of a consistency such that it can be readily stirred into the liquid glue or liquid resin adhesive. Mixtures thus prepared are quite stable and, as has been stated, have the decided advantage over calcium carbonate that the wollastonite particles remain suspended for considerable periods of time whereas under similar conditions the calcium carbonate particles tend to settle much more rapidly.

The invention will now be illustrated by reference to certain specific examples, it being understood that the examples are for illustrative purposes only and are not limitative.

*Example 1*

Abrasive paper suitable for the manufacture of belts was prepared by coating 130 pound cylinder paper, which is a paper of such density and thickness that a papermaker's ream of 480 sheets 24 inches by 36 inches weighs 130 pounds. The making coat was a hide glue made by dissolving 100 parts of glue in 140 parts of water to provide a liquid having a viscosity of 5500 centipoises at 140° F.

The making coat was applied in the amount of 7 pounds per sandpapermaker's ream of 480 sheets 9 inches by 11 inches and coated with 100 grit fused alumina abrasive grain in the amount of 19 pounds per ream. The product was then dried until the glue had gelled sufficiently to allow the application of the sandsize whereupon a sandsizing coat was applied.

The sandsizing adhesive was made by admixing into a glue solution a suspension of wollastonite made by stirring 300 parts by weight of wollastonite of the kind set forth in the table above into 150 parts of water containing 2 parts of sodium hexametaphosphate and allowing the mixture to stand for 5 hours while slowly agitating. The glue solution consisted of 150 parts by weight of hide glue dissolved in 220 parts by weight of water. The adhesive mixture had a viscosity of 200 centipoises at 140° F.

8 pounds per ream of this liquid sandsizing adhesive was used whereupon the product was dried in the conventional manner and manufactured into abrasive belts. The belts were used to finish bumper bar stock for automobile bumpers and were reported to produce up to as much as 100% more finish product than belts of the prior art while giving a desirable finish.

The making coat, after drying, consisted of 5 pounds per ream of glue while the dried sizing coat contained approximately 1.5 pounds per ream of glue and 2.9 pounds per ream of wollastonite. The total bond therefore contained approximately 69% glue and 31% wollastonite.

*Example 2*

A glue bonded metal cloth was made by coating jeans cloth which had been previously filled with glue and starch according to practice of the prior art, first with 14 pounds per sandpapermaker's ream of making coat followed by 14.8 pounds per ream of 120 grit fused alumina abrasive grain. After drying the sandsize was applied in the amount of 4 pounds per ream and the product was then dried and made into belts. After drying the making coat consisted of 4.5 pounds each of glue and wollastonite and the sandsize 1.0 and 2.0 of glue and wollastonite, respectively. The making coat therefore contained 50% each of glue and wollastonite; the sandsize, like that of Example 1, contained approximately 33% glue and 67% wollastonite; and the total bond contained approximately 46% glue and 54% wollastonite.

The making coat was hide glue containing 50% wollastonite by weight based on the total of the filler and the dry glue and had a viscosity of 3000 centipoises at 140° F. The sandsizing coat was similar except that the filler was present in the amount of 67% wollastonite to 33% dry glue and except that it was more dilute, having a viscosity of 200 centipoises at 140° F.

*Example 3*

Abrasive discs were made on a backing of vulcanized fiber .030 inch thick. The making coat, which had a viscosity of 2500 centipoises at 90° F., was applied in the amount of 8 pounds per ream. .59 pounds per ream of 36 grit fused alumina was then applied whereupon the product was dried for 1 hour at 180° F. to solidify the making coat. Sandsize in the amount of 35 pounds per ream was then applied and the product first dried for 1 hour at 175° F. followed by an oven cure of 2 hours at 175° F., 3 hours at 200° F., and 4 hours at 225° F.

The making and sandsizing coats both comprised a water-miscible liquid phenol-formaldehyde resin having a viscosity of 6000 centipoises at 25° C. The making coat was prepared by diluting 3300 parts by weight of resin with 180 parts by weight of water. The sandsizing coat was prepared by stirring 52 parts of wollastonite into a mixture of 33 parts of the liquid resin and 15 parts of water. The sandsizing adhesive, which had a viscosity of 1200 centipoises at 90° F., contained 52% by weight wollastonite, 33% by weight of the liquid resin of the making coat, and 15% water.

The resin was prepared according to the following procedure. A vessel equipped with a reflux condenser, agitator, and thermometer was charged with the following materials, all parts being by weight:

| | |
|---|---|
| Liquid USP phenol (90%) | 1254 |
| 36.8% aqueous formaldehyde | 1168 |
| $Ba(OH)_2 \cdot 8H_2O$ | 56.4 |
| Diethylene glycol | 112.8 |

The mass was heated at a substantially uniform rate of increase in temperature up to a temperature of 60° C. over a period of 2 hours and 13 minutes. It was refluxed at that temperature and then dehydrated by evacuation to such condition that it had a solids content of 72% and a viscosity of 6000 centipoises at 25° C.

The product of this example was cut into discs which were used for grinding metal and were found to be highly satisfactory.

In the examples I have described the use of a particular grade of commercial wollastonite but some variation is permissible in both the size and the distribution of the particle size and shapes of the product which can be used in carrying out my invention. In general I have found that it is desirable to use wollastonite of such fineness that at least about 80% will pass through a 325 mesh screen and that by microscopic count at least 70% of the particles by count shall be less than 4 microns in length. As to those particles which are longer than 4 microns, it is also desirable that the average ratio of length to diameter shall be at least 3, the average diameter (as distinguished from the length) shall lie within the range of 4–8 microns and that the average length should come within the range of about 12–30 microns.

My discovery that improved products can be made with the use of wollastonite as a filler is contrary to the teachings of Patent 2,322,156 and other practices of the prior art. It has generally been believed, as is stated in the patent, that it is necessary to use a rather chunky, blocky filler as distinguished from a fibrous filler such as asbestos or cotton. For example, Patent 2,322,156 on page 2 in column 1 states that the filler used according to that patent must be non-fibrous, and a distinction is drawn between the filler of the patent and fibrous materials such as asbestos or cotton which, according to the patent, have been found to be inoperative. Contrary to such teachings I have found that wollastonite makes a product which is superior for some purposes and that it has the advantage over the granular or blocky type fillers of the prior art that it remains in suspension much longer. I have also found that products made according to my invention have much less tendency to curl than is the case with products made according to Patent 2,322,156 or without any filler, particularly where the adhesive is glue. The products of the prior art tend to curl with the abrasive coated side convex and such curl has always been a problem in the abrasive industry. The fact that products made according to my invention have decidedly less tendency to curl represents a very substantial improvement in the art.

I have given an example of the manufacture of abrasive discs in which an water-miscible liquid resin was employed as the bond. However it is not necessary to use a resin of that character since other phenol-formaldehyde condensation products which are not water-miscible and in which the viscosity is adjusted by the use of a solvent such as furfural may also be employed. In such case the wollastonite may be incorporated directly into the liquid resin adhesive without the use of water and when this is done there is no difficulty in dispersing the wollastonite through the resin.

On the other hand, where water is employed in the system as in the case of glue, phenolic resins which have been thinned with water and where aqueuos suspensions of resins such as certain urea-formaldehyde and melamine-formaldehyde resins are used, it is preferable to first disperse the wollastonite in water as described in connection with Example 1.

Certain specific embodiments of the invention have been set forth in the examples. Other modifications of the invention such as the use of other kinds of backings and abrasive grains and other combinations of adhesive such as the use of a urea-formaldehyde resin sandsizing coat over a glue making coat and other conventional modifications common in the abrasive art may also be employed. It is therefore to be understood that the invention is not to be limited to the specific examples but that other compositions and procedures common to the prior art may be employed and various modifications may be made without departing from the spirit of the invention the scope of which is defined in the following claims.

I claim:

1. A coated abrasive article comprising a backing having a layer of abrasive grain attached to a surface thereof by a bond consisting essentially of (a) a material selected from the group consisting of animal glue and a heat hardened synthetic resin selected from the group consisting of phenol-formaldehyde, urea-formaldehyde and melamine-formaldehyde resins, and (b) a substantial amount of wollastonite; the particles of said wollastonite being of such size and shape that at least about 80% will pass through a 325 mesh screen and at least about 70% of the particles by count shall be less than 4 microns in length, the particles having a length greater than 4 microns having an average ratio of length to diameter of at least 3:1 and an average diameter within the range of about 4–8 microns.

2. A coated abrasive article comprising a backing having a layer of abrasive grain attached to a surface thereof by a bond consisting essentially of animal glue and a substantial amount of wollastonite; the particles of said wollastonite being of such size and shape that at least about 80% will pass through a 325 mesh screen and at least about 70% of the particles by count shall be less than 4 microns in length, the particles having a length greater than 4 microns having an average ratio of length to diameter of at least 3:1 and an average diameter within the range of about 4–8 microns.

3. In a method of making a coated abrasive article the steps which comprise: mixing wollastonite with water containing a small quantity of a deflocculating agent to obtain a viscous paste, allowing the mixture to stand for several hours until the viscosity is reduced to the point where the mixture is miscible with a liquid adhesive, forming a bonding adhesive by mixing the wollastonite suspension with a liquid adhesive selected from the group consisting of animal glue and a heat-hardenable synthetic resin selected from the group consisting of phenol-formaldehyde, urea-formaldehyde, and melamine-formaldehyde condensation product, coating a backing with abrasive grains and with a bond for the grains comprising said bonding adhesive, and solidifying said bonding adhesive.

4. Method as claimed in claim 3 wherein said bonding adhesive containing wollastonite is applied as a sandsize over the abrasive grains and a solidified making coat.

5. Method as claimed in claim 4 wherein both the making coat and the sandsizing coat comprise animal glue.

6. Method as claimed in claim 4 wherein at least the sandsizing coat comprises a heat-hardenable synthetic resin of the class set forth in claim 3.

7. In a method of making a coated abrasive article the steps which comprise: mixing wollastonite with water containing a small quantity of a deflocculating agent to obtain a viscous paste, allowing the mixture to stand for several hours until the viscosity is reduced to the point where the mixture is miscible with a liquid adhesive, mixing the wollastonite suspension with a solution of hide glue in water to form a liquid adhesive, coating a backing with abrasive grains and with the said liquid adhesive, and solidifying the adhesive.

8. Method as claimed in claim 7 wherein the said liquid adhesive is applied as a sandsize coat over the abrasive grains and a solidified making coat of animal glue.

9. Method as claimed in claim 8 wherein the wollastonite comprises about 67% of the sandsize.

10. Method as claimed in claim 7 wherein the mixture of wollastonite and water comprises about 67% wollastonite.

References Cited in the file of this patent
UNITED STATES PATENTS

| | | |
|---|---|---|
| 342,112 | Stenvik | May 11, 1943 |
| 2,332,156 | Oglesby | June 15, 1943 |
| 2,534,805 | Waterfield | Dec. 19, 1950 |
| 2,558,411 | Austin et al. | June 26, 1951 |